UNITED STATES PATENT OFFICE.

PHILIP A. SINGER, OF CHICAGO, ILLINOIS, ASSIGNOR OF ONE-HALF TO CARL S. MINER, OF CHICAGO, ILLINOIS.

METHOD OF UTILIZING WASTE PRODUCTS OF CANNING INDUSTRY.

1,063,297.  Specification of Letters Patent.  Patented June 3, 1913.

No Drawing.  Application filed December 26, 1912.  Serial No. 738,781.

*To all whom it may concern:*

Be it known that I, PHILIP A. SINGER, a citizen of the United States, residing at Chicago, in the county of Cook and State of Illinois, have invented new and useful Improvements in Methods of Utilizing Waste Products of Canning Industry, of which the following is a full, clear, concise, and exact description.

My invention relates to a method of utilizing what have heretofore been the waste products of the canning industry.

According to the methods heretofore employed in the canning of what is known as sweet corn or sugar corn it has been the practice in preparing the corn for canning to first separate the husk and silk from the ear as completely as possible and then to cut the corn from the ear with curved knives set parallel to the axis of the cob. This cutting operation merely cuts the tops of the kernels off, no attempt being made to remove all of the kernels but merely severing the same in such a way as to leave on the cob approximately the portion of the kernel below the upper third of the germ. The cob with the remaining portion of the kernel including the greater part of the germ, a considerable amount of the bran, and a considerable proportion of the milk is subjected to a so-called scraping which is designed to press out or expel as much as possible of the milk remaining in the portion of the kernel still on the cob and without removing any of the bran. This milk is then added to the portions of the kernels previously cut off and the mixture, after being cooked, canned and sterilized becomes the canned corn of commerce. The cob with the portions of the kernel remaining on it is thrown away or at best fed immediately to stock. There is thus lost not only the major portion of the germ of the kernel but also a considerable proportion of the bran, since in the cutting operation only the top of the germ and about one-half of the bran is removed. Moreover, as care is taken not to remove the bran in scraping the cob to expel the milk from the portions of the kernels remaining on the cob it results that more or less of the milk is lost.

The object of my invention is to provide a method by which these waste products— the milk residue, germs and bran—can be utilized, the method resulting not only in the saving of the bran and germs but also resulting in an increased quantity of milk obtained for addition to the corn in the canning process.

In carrying out the method of my invention, I take the cobs after the upper portions of the kernels have been cut off according to the usual practice and subject them to a scraping or brushing operation which removes all of the remaining portions of the kernels from the cob. This scraping or brushing operation may be accomplished by any suitable machine or tool, it being only necessary that the machine or tool employed shall completely or substantially completely remove all of the remaining portions of the kernels—milk, bran and germ—so that the waste product consists substantially of nothing but the cob. Of course, it is to be understood that this step of the process may be carried out by only partially removing the remaining portions of germ, milk and bran, but with less advantageous results, so that I prefer in order to secure the best results to completely remove such remaining portions of the kernels. The material which has been scraped or brushed from the cob, and which consists of milk, germ and bran, is then subjected to pressure to expel the milk or juice in the mass. The pressure is preferably continued until the moisture content is reduced to approximately 60%. Any suitable press may be employed for this purpose. For example, what is known as a "German squeezer" may be advantageously employed. The juice or milk, as it is usually called, which has been expelled from the mass is returned to the canning process, that is, added to the portions of the kernels cut off in the first instance, and with such portions treated in the usual manner followed in the canning. However, this added milk or juice is obtained in greater quantity according to my method than by following the usual scraping, since in such scraping care is taken not to remove the bran and consequently a considerable proportion of the milk itself is lost.

When according to my method the scraping or brushing is of such nature that the germs and remaining portions of the bran are purposely removed with the milk, and the whole subjected to pressure to expel the juices which are of substantially the same nature as the material separated by the old method of scraping a valuable addition to the yield for canning results. This milk or juice may also be used for other purposes, for example, for the production of alcohol, or it may be dried and employed as a dry distillery product. It may also be dried in film-like form and used as a breakfast food.

The solid material remaining in the press after expressing the juices or milk in the manner described and consisting substantially of bran and germs is then treated to obtain therefrom corn oil, oil cake, and in some instances where the bran is separated from the germs, bran which may be utilized as a feed stuff. To this end the germs either alone or mixed with the bran are dried and then subjected to pressure to express the oil therefrom. Thus, the mass taken from the squeezer after the milk or juice has been expelled may be dried in any suitable manner and in any suitable apparatus. After the mass has been dried it is then subjected to pressure in an oil press to expel the oil from the germs. Under this treatment an excellent grade and yield of corn oil is obtained, the residue being compressed corn oil cake, both of which are valuable and useful materials, but neither of which has, so far as I am aware, ever been prepared from sweet corn before.

In the foregoing example, the bran is retained with the germ during the steps of drying and expressing the oil from the germs. I may, however, before the drying action, separate the bran from the germs and dry the bran so that the same may be utilized as a feed stuff, and subject the germs alone to pressure, after being dried, to express the oil and form oil cake. Such separation of the germs and bran may be attained in any suitable way, as by mixing the germs and bran with a liquor of such gravity that the oil containing germs will float, and the bran will sink, the mass being thus separated into its constitutents; or the whole mass may be dried, and the bran and germs separated by screens and air blasts after which the germs may be pressed to expel the oil and form the residue into oil cake, while the bran may be used for feed stuff.

By means of my process valuable commercial commodities in the form of corn milk, corn oil, oil cake, and, when the bran is separated from the germs, bran are obtained as by-products from what has heretofore been waste in the corn canning industry. Such corn oil cake is characterized by a high content of natural corn sugar and a sweet taste.

By scraping all or substantially all of the portions of the kernels—including the bran, germs and milk—which remain on the ear after the tops have been cut off for canning, and subjecting the mass to pressure, according to my process, enables one to obtain a much greater quantity of milk to be added to the corn being put through the canning process or to be used for other purposes, than has been possible under the methods which have heretofore been followed.

Having thus fully described my invention, what I claim as new and desire to secure by Letters Patent, is—

1. The method of utilizing the waste products of the corn canning industry which consists in removing the portions of the kernels—including the bran, germs and milk—which remain on the cob after the upper portions of such kernels have been removed for canning, then removing substantially all of the juice from the mass, then drying the mass and subjecting it, either with or without previous removal of the bran, to pressure to extract the oil therefrom and form oil cake of the residue.

2. The method of utilizing the waste products of the corn canning industry which consists in removing the portions of the kernels—including the bran, germs and milk—which remain on the cob after the upper portions of such kernels have been cut off for canning, then subjecting the mass to pressure to expel substantially all of the juice therefrom, then expelling the oil in the germs while in a dry state by pressure to produce corn oil.

3. The method of utilizing the waste products of the corn canning industry which consists in removing the portions of the kernels—including the bran, germs and milk—which remain on the cob after the upper portions of such kernels have been cut off for canning; then expelling substantially all of the juice from the mass, drying the mass, and then expelling the oil from the dried mass to produce corn oil and oil cake.

4. A method of utilizing the waste products of the corn canning industry which consists in removing substantially all of the portions of the kernels—including the bran, germs and milk—which remain on the cob after the upper portions of such kernels have been removed for canning, and then subjecting the mass so removed to pressure to express substantially all the milk or juice therefrom.

5. As a new article of manufacture, a compressed oil cake including the germ and bran of sweet corn separated from the milk and from which the oil has been extracted, characterized by a high content of natural corn sugar and a sweet taste, substantially as described.

In witness whereof, I have hereunto subscribed my name in the presence of two witnesses.

PHILIP A. SINGER.

Witnesses:
 CARL S. MINER,
 CHARLES G. COPE.